United States Patent [19]

Boulanger et al.

[11] Patent Number: 5,613,601
[45] Date of Patent: Mar. 25, 1997

[54] PACKAGE FOR DISPENSING A FLUID TREATING SUBSTANCE AND METHOD AND APPARATUS FOR HEAT-SEALING THE DISPENSING PACKAGE

[75] Inventors: Roger Boulanger, Ste-Julie; Flavio Metta, Longeuil, both of Canada

[73] Assignee: Johnson & Johnson Inc., Montreal, Canada

[21] Appl. No.: 455,789

[22] Filed: May 31, 1995

Related U.S. Application Data

[62] Division of Ser. No. 126,938, Sep. 24, 1993, Pat. No. 5,456,055.

[51] Int. Cl.⁶ .............................. B65B 11/50; B65B 29/02
[52] U.S. Cl. ................................................ 206/0.5; 53/463
[58] Field of Search ................................ 206/0.5; 53/479, 53/477, 463

[56] References Cited

U.S. PATENT DOCUMENTS

| | | | |
|---|---|---|---|
| 2,531,594 | 11/1950 | Abrahams | 206/0.5 |
| 2,655,979 | 10/1953 | Eaton | 53/374.2 X |
| 2,852,795 | 9/1958 | Hermanson et al. | 206/0.5 X |
| 2,925,171 | 2/1960 | Eaton | 206/0.5 X |
| 2,954,294 | 9/1960 | Whelan | 206/0.5 X |
| 3,384,492 | 5/1968 | Spencer | 206/0.5 X |
| 4,410,441 | 10/1983 | Davies et al. | 205/0.5 |
| 4,876,023 | 10/1989 | Dickenson et al. | 206/0.5 X |

*Primary Examiner*—James F. Coan
*Attorney, Agent, or Firm*—James P. Barr

[57] ABSTRACT

A package for dispensing a substance that imparts a desirable property to a body of water. The dispensing package comprises a water permeable bag of non-woven fabric enclosing a predetermined quantity of particulated product, such as tea or coffee that releases a flavouring substance in steeping liquid. The non-woven fabric has a thermally activated bonding surface permitting to permanently close the bag by peripherally heat-sealing the bag walls to one another. The heat-sealing operation is performed by driving in the wall portions to be joined a multitude of heated projections that rapidly transfer heat to the thermally activated bonding layers in order to quickly effect the seal. The resulting joint area displays a plurality of perforations formed by the heated projections. The invention also extends to a method and apparatus for heat-sealing the dispensing package.

17 Claims, 8 Drawing Sheets

PACKAGE FOR DISPENSING A FLUID TREATING SUBSTANCE AND METHOD AND APPARATUS FOR HEAT-SEALING THE DISPENSING PACKAGE

This is a division of application Ser. No. 08/126,938, filed Sep. 24, 1993, now U.S. Pat. No. 5,456,055, which is hereby incorporated by reference.

FIELD OF THE INVENTION

The present invention relates to a package for dispensing a substance that imparts a desirable property to a body of fluid. In an exemplary form of construction the dispensing package is an infusion packet that releases a desired flavouring agent, as tea or coffee, in steeping liquid. The dispensing package in accordance with the invention has a foraminous bag of non-woven fibrous material enclosing the water treating substance, characterized by an improved heat-seal permanently joining the bag walls. The heat-seal is highly resistant and can be formed on high speed machines. The invention also extends to a method and to an apparatus for heat-sealing the dispensing package.

BACKGROUND OF THE INVENTION

Common infusion packets utilize water-permeable bags of paper material to contain the percolative product, such as tea, coffee or herb particles. The porosity of the paper bag is selected to prevent the percolative product to sift-out of the water-diffusion apertures, while allowing the flavouring substance released in the steeping liquid to freely egress the infusion packet and disperse in the surrounding body of water.

Paper bags offer the advantage of being relatively inexpensive. In addition they can be sealed on high speed automatic equipment that enables to mass produce the infusion package at low cost. However, paper material has some drawbacks, such as a poor wet-strength that may cause the infusion packet to break open in use or otherwise undesirably dispel its contents. Furthermore, the paper material may not have a degree of water-permeability that is sufficiently high for an optimal percolation effect to take place.

Infusion packets have also been manufactured with bags of fibrous, non-woven material, as disclosed in the Canadian patent 802,720 granted to Johnson & Johnson, U.S.A. on Dec. 31, 1968. The subject matter of this patent is incorporated herein by reference. Bags of non-woven fibrous material present certain advantages over paper bags such as an increased wet strength and a higher water-permeability. However, bags of non-woven fibrous material are difficult to seal in a reliable fashion on conventional high-speed equipment primarily due to the fact that the bag walls must remain in contact with the heat-sealing dies for a comparatively long period of time which significantly reduces the overall production rate, thereby making the final product more expensive to manufacture.

OBJECTS OF THE INVENTION

An object of the present invention is a package for dispensing a substance to treat a body of fluid, having a foraminous containment bag of non-woven fabric that is closed with a seal requiring a short residence time of the non-woven fabric between heat-sealing dies in order to be formed, yet being highly resistant to prevent the package from undesirably dispelling its contents.

Another object of the invention is a novel method and apparatus for heat-sealing the aforementioned dispensing package.

SUMMARY OF THE INVENTION

As embodied and broadly described herein, the invention provides a package for dispensing a substance that imparts a desirable property to a body of fluid, comprising:

a predetermined quantity of particulated substance capable of releasing an agent which donates to the body of fluid the desired property; and a bag of foraminous material enclosing said particulated substance, said bag of foraminous material constituting a confining barrier to prevent said particulated substance in a dry state to freely sift-out of said bag, said bag including a pair of walls of non-woven fibrous material united to one another at a laminated joint area, said laminated joint area including:

a) a first fiber layer including bond-forming fibers fusible at a certain temperature;

b) second and third fiber layers including fibers of a material in a substantially solid phase at said certain temperature, said first fiber layer being located between said second and third fiber layers; and c) a plurality of perforations (for the purpose of this specification "perforation" means either an aperture passing completely through the joint area or a partial opening such as a blind hole in the joint area) in a spaced apart relationship passing completely through one of said second and third fiber layers and extending into said first fiber layer.

Most preferably, the bag of the dispensing package is water-permeable and it is made from a dual-layer non-woven fibrous material having an outer heat-resistant layer superposed to an inner thermally activated bonding layer. The water-permeable bag is assembled by depositing a predetermined amount of the selected particulate substance, such as tea or coffee between a pair of superposed panels of the non-woven fibrous material forming the respective opposing walls of the bag. The orientation of the panels is such that their thermally activated bonding surfaces face each other. The resulting bag is then heat-sealed by bonding together the peripheral portions of the panels to form a continuous joint area completely encircling the particulated substance held in the bag.

The bonding operation is performed by passing the peripheral superposed portions of the panels in which the bond-forming fibrous layers are in mutual contact, between a pair of heated sealing rolls that momentarily fuse the bond-forming fibers to effect the joint. An important characteristic of the invention resides in that at least one of the sealing rolls is provided with a multitude of small heated projections in a spaced apart relationship that locally penetrate the surface of the non-woven fibrous material to establish a direct contact with the bond-forming fibers in order to rapidly transfer thermal energy to them. As a result, the bond-forming fibers are raised to the melting temperature in a short period of time comparatively to an arrangement in which the bond-forming fibers are thermally activated solely by heat migrations through the heat-resistant outer layers.

Advantageously, the non-woven fibrous material is treated with binder to increase its resistance. Different binders are used for the various layers to provide the desired behaviour under the application of heat. More particularly, the heat resistant layer is treated with binder that remains in a solid state at the melting temperature of the bond-forming fibers. In contrast, a binder having a low melting point is used for the bond-forming fibrous layer that will liquify at the temperature at which the bond-forming fibers melt to promote the formation of a complete and strong joint.

As suggested by the broad language used to describe the article of manufacture in accordance with the invention, the bag of foraminous fibrous material may contain a wide variety of particulated substances capable of releasing a desired active ingredient in a body of fluid such as water. For example, the particulated substance is steepable to yield an edible infusion, such as tea or coffee. Alternatively, the particulated product may be a laundry treating composition, such as a detergent, a bleaching agent, a laundry softening agent or an anti-static agent, among others.

As embodied and broadly described herein, the invention also provides a method for sealing a bag of foraminous material that encloses a predetermined quantity of particulated substance capable of releasing an agent in a body of fluid to impart to the body of fluid a desired property, in a sealed condition said bag of foraminous material constituting a confining barrier preventing said particulated substance in a dry state to freely sift-out of said bag, said bag including a pair of walls of non-woven fibrous material, one of said walls comprising:

i) a first fiber layer including bond-forming fibers fusible at a certain temperature; and ii) a second fiber layer including fibers of a material in a substantially solid phase at said certain temperature, another one of said walls comprising a layer of fibers of a material in a substantially solid phase at said certain temperature, said method including the steps of:

a) pressing superposed portions of said walls against one another whereby said first fiber layer is located between said second fiber layer and said another wall;

b) driving into said superposed portions a plurality of spaced apart heated projections at such depth as to establish direct contact between said heated projections and said first layer in order to elevate a temperature of said bond-forming fibers at least in a vicinity of said heated projections to said certain temperature for causing said superposed portions to bond to one another.

As embodied and broadly described herein, the invention further provides a device for heat-sealing a bag of foraminous material that encloses a predetermined quantity of particulated substance capable of releasing an agent in a body of fluid to impart to the body of fluid a desired property, in a sealed condition the bag of foraminous material constituting a confining barrier preventing the particulated product in a dry state to freely sift-out of the bag, the bag prior to being sealed including:

a pair of walls defining superposed portions for thermal bonding to one another to form a joint area that seals the bag; and a protuberant portion adjacent to the superposed portions, the protuberant portion holding the particulated substance, said device including:

a pair of rotatable sealing rolls defining therebetween a nip region;

one of said sealing rolls including a recessed portion on a circumferential surface thereof for receiving the protuberant portion of a bag of foraminous material to be sealed;

a first one of said sealing rolls including a seal-forming area on a circumferential surface thereof, said seal-forming area including a multitude of projecting perforating members in a spaced apart relationship;

a second one of said sealing rolls including an anvil area on a circumferential surface thereof;

drive means for rotating said sealing rolls in a timed relationship, whereby said seal-forming area and said anvil area pass concurrently and in a face-to-face relationship through said nip region; and means for heating said projecting perforating members, whereby passage of a non-sealed bag through said nip region causes engagement of the superposed portions of the walls of the bag between said seal-forming area and said anvil area and penetration of said projecting perforating members through a surface of at least one of the superposed portions to thermally seal the superposed portions and form the joint area, during the formation of the joint area the protuberant portion of the bag enters said recessed portion to avoid damage to the particulated substance in the bag.

In a most preferred embodiment, the first sealing roll includes a plurality of recessed portions arranged serially in a spaced apart relationship on the periphery of the roll. The seal-forming area is continuous over the entire roll and surrounds completely each recessed portion. The structure of the second sealing roll is nearly identical, with the exception that the anvil area, that corresponds in configuration and extent to the seal-forming area, is smooth and free of projections. The first and second sealing rolls are driven in a timed relationship so that the recessed portions of the rolls register with one another while passing through the nip region to form clamshell pockets receiving the protuberant portions of bags that are in the process of being sealed by the seal-forming area in high pressure rolling contact with the anvil area.

DESCRIPTION OF A PREFERRED EMBODIMENT

Figure 1:
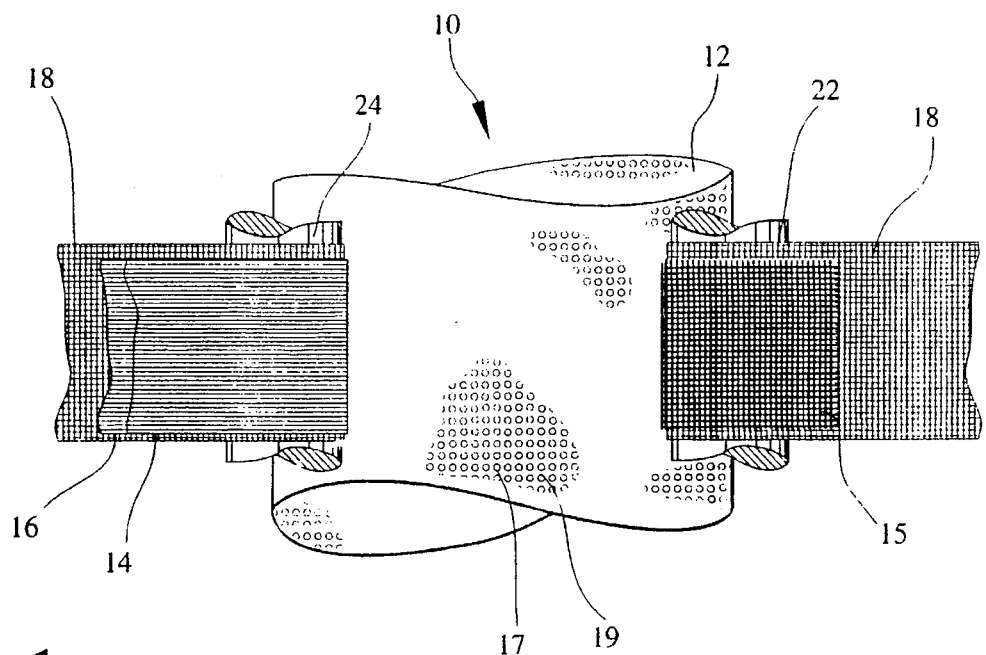
FIG. 1 is a partial top plan view of a fiber-entangling station for producing the dual-layer non-woven fabric suitable for making the dispensing package in accordance with the invention.
Figure 2:
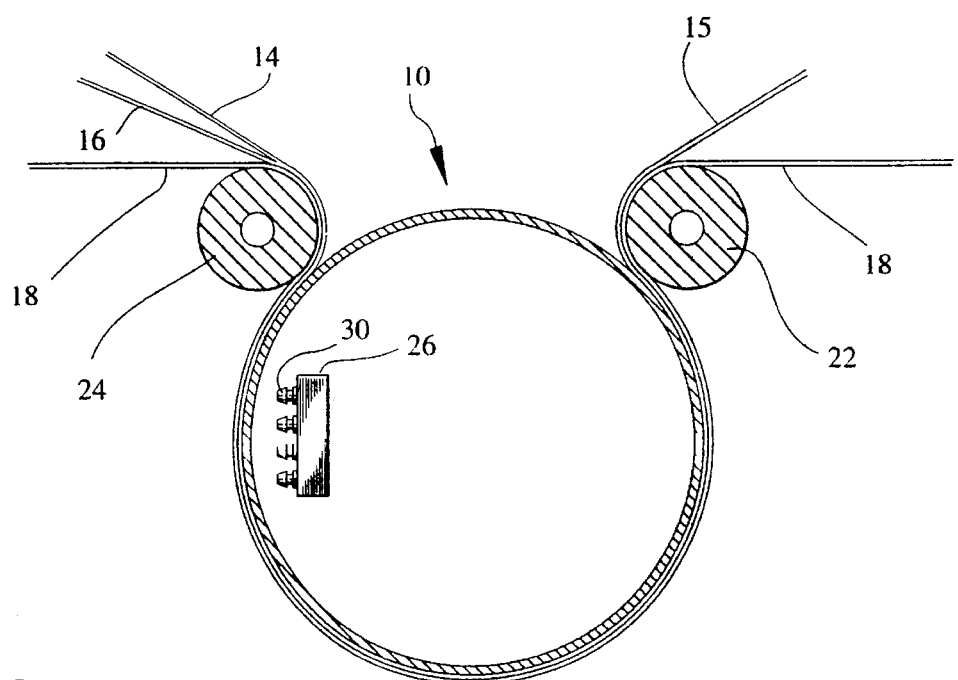
FIG. 2 is a side elevational view of the fiber-entangling station shown in FIG. 1.

FIGS. 1 and 2 of the annexed drawings illustrate the structure of a fiber-entangling station 10 that produces a non-woven fabric having a thermally activated bonding layer laminated to a heat-resistant layer, that is particularly well-suited for manufacturing a water-permeable bag of an infusion packet in accordance with the present invention.

The dual-layer non-woven fabric is made from loose fibrous webs in which the individual fibers are free to move one relatively to the other, by the application of fluid forces that arrange the fibers into a unitary fabric structure. The concept of an apparatus for producing a foraminous fabric by applying fluid forces to a fibrous web is a well-known technique and details on this method can be found in the prior art. At this end, example may be had to the following Canadian patents granted to Johnson & Johnson, U.S.A. which constitute references of interest to the present subject. The subject matter of these patents is incorporated herein by reference.

| CANADIAN PATENTS | ISSUE DATES |
| --- | --- |
| 915,398 | November 28, 1972 |
| 915,397 | November 28, 1972 |
| 915,398 | November 28, 1972 |
| 915,399 | November 28, 1972 |
| 915,400 | November 28, 1972 |
| 915,401 | November 28, 1972 |
| 915,402 | November 28, 1972 |
| 915,403 | November 28, 1972 |
| 915,408 | November 28, 1972 |
| 1,143,929 | April 5, 1983 |

The fiber-entangling station 10 comprises a rotating, perforated, horizontally extending drum 12 partially wrapped by two superposed fiber layers 14 and 16 forming the thermally activated adhesive layer and the heat-resistant layer respectively, of the non-woven fabric 15. The fiber layers 14, 16 and the resulting non-woven fabric 15 are maintained against the drum 12 by a screen belt 18 and a pair of guide rollers 22 and 24.

The drum 12 comprises perforation 17 extending on its entire peripheral surface and spaced apart from one another by land areas 19 that are constituted by the non-perforated drum surface. The drum 12 is mounted for rotation in a suitable cradle (not shown) and it is coupled to a driving system to rotate the drum 12 in the desired direction. The drum driving system will not be described here because it is of a conventional construction.

The fiber layer 14 that forms the thermally activated bonding surface of the fabric 15 faces the drum 12 and comprises fibers of a low melt thermoplastic material such as co-polyester. The fiber layer 14 also comprises filler fibers such as rayon, which have been found particularly advantageous because of their low cost. Preferably, the proportion of low melt thermoplastic and filler fibers is 75/25, although a lower or a higher content of low melt thermoplastic fibers is possible.

The fiber layer 16 that forms the heat-resistant surface of the fabric 15, faces the screen belt in the fiber-entangling station 10 and comprises fibers of a material having a substantially higher melting temperature than the low melt thermoplastic material used in the bonding layer 14, so as to remain dimensionally stable at the temperature required to fuse the adhesive surface of the non-woven fabric 15. For example, rayon fibers have been found satisfactory. Other types of fibers can also be used as it will be plain to those skilled in the art.

The fiber layers 14 and 16 are supplied to the fiber-entangling station 10 from respective carding machines, not shown in the drawings, of a type well-known in the art. The purpose of the carding operation is to disentangle the raw fibers and orient them in the machine direction.

Figure 5:
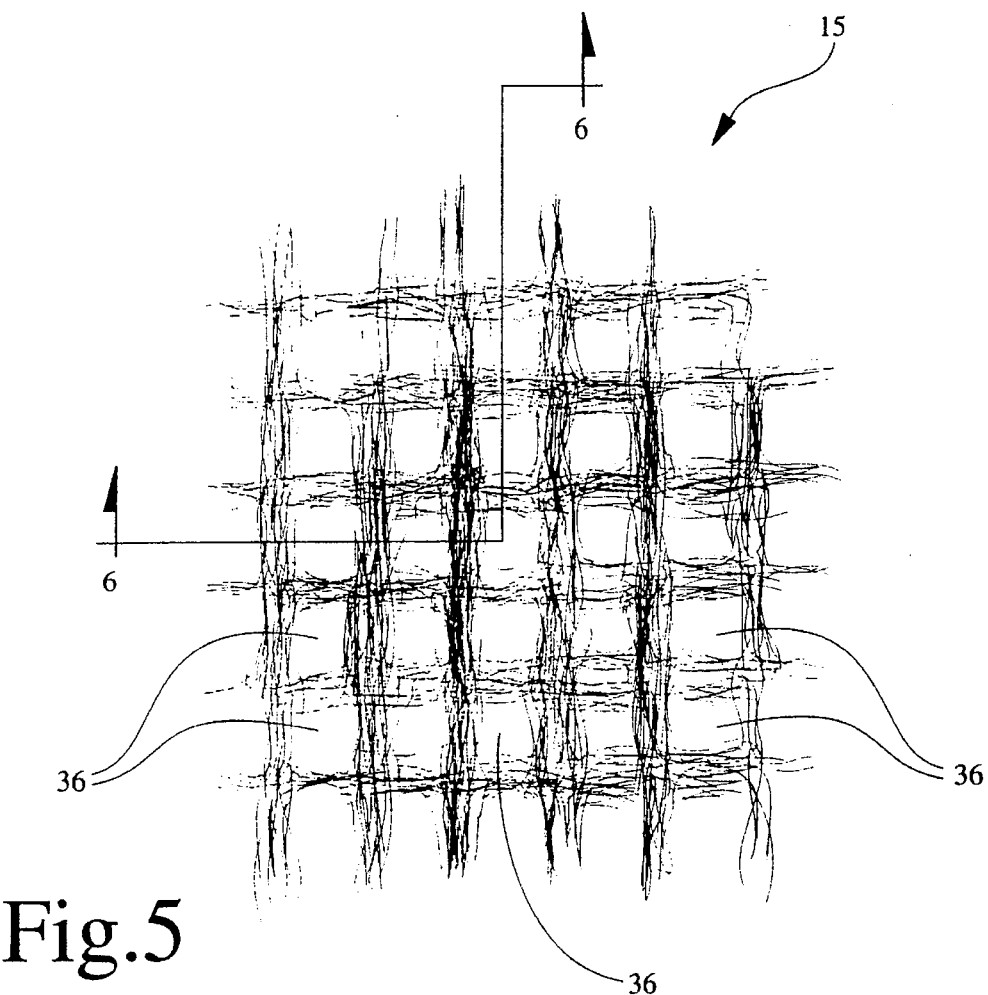
FIG. 5 is a highly enlarged top plan view of the non-woven fabric produced with the fiber entangling station of FIGS. 1 and 2.
Figure 6:
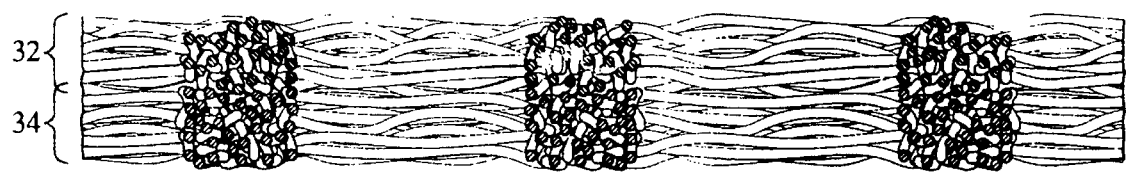
FIG. 6 is a cross-sectional view taken along lines 6—6 in FIG. 5.

A manifold 26 for jetting a fluid stream, preferably water, to generate the fluid forces that interlock the fibers of layers 14 and 16 into a foraminous network, is mounted inside the perforated drum 12. The manifold 26 produces fluid jets directed at the fiber layers 14 and 16. More particularly, the manifold 26 includes an array of individual nozzles 30 arranged in horizontal rows. Each row of nozzles 30 extends the entire length of the drum 12, and the nozzles 30 in adjacent rows are arranged in a staggered relationship. Water jetted from the nozzles 30 emerges from the drum perforations 17 as water streams that thrust and pack the individual fibers of the layers 14 and 16 over the land areas 19 where they become mechanically interlocked and entangled. The structure of the resulting fibrous network is more clearly shown in FIGS. 5 and 6. The fabric 15 has a laminated structure having a top heat-resistant layer 32 intimately united to a bottom thermally activated bonding layer 34. The layers 32 and 34 are provided on their entire surface with apertures 36 that render the fabric 15 water-permeable. The apertures 36 generally correspond to the dimensions and the distribution of the drum apertures 17.

The non-woven fabric 15 is treated with binder for increasing the structural integrity of the fibrous network. The various layers of the non-woven fabric 15 are treated with different types of binder that respond to the application of heat in a similar fashion to the material of the respective fiber layer. To achieve a selective binder deposition, two binder applicator stations are provided, downstream of the fiber-entangling station 10, each binder applicator station depositing a different binder substance.

Figure 3:
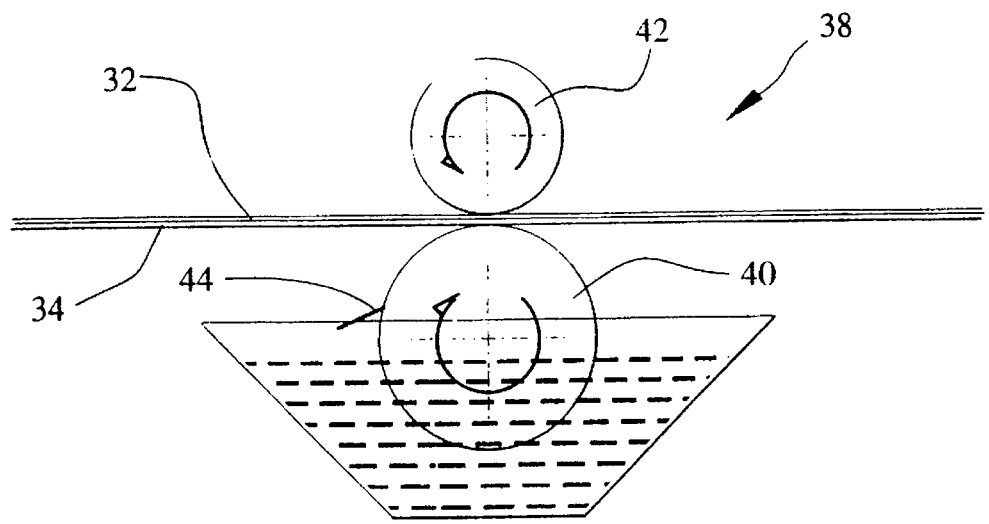
FIG. 3 is a schematical side elevational view of a first binder applicator station for treating with binder composition one layer of the non-woven fabric produced with the fiber-entangling station shown in FIGS. 1 and 2.
Figure 4:
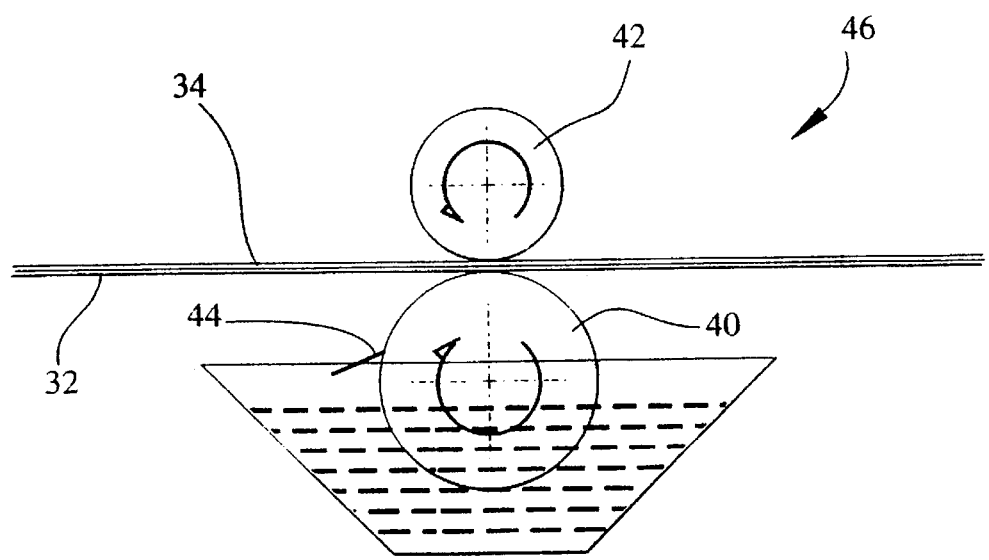
FIG. 4 is a schematical side elevational view of a second binder applicator station for treating with binder composition the other layer of the non-woven fabric produced with the fiber-entangling station shown in FIGS. 1 and 2.

The first binder applicator station illustrated in FIG. 3 and designated comprehensively by the reference numeral 38 treats the thermally activated bonding layer 34. The binder applicator station 38 comprises a coating roll 40 having a lower end immersed in a binder bath. A back-up roll 42 is provided above the roll 40 to define therewith a nip through which the non-woven fabric 15 passes. A scraper blade 44 is provided to control the thickness of the binder film adhering to the surface of the coating roll 40.

A smooth-surfaced coating roll 40 will achieve a uniform binder deposition, which is acceptable for some applications. However, it is preferred to apply the binder according to a pattern of parallel lines. To achieve the desired binder deposition pattern, a coating roll having a relief surface is required, the recessed areas of the relief surface constituting the binder transfer sites. In a preferred form of construction, the circumferential surface of the coating roll is machined to form a multitude of oblique grooves which are parallel to one another and apply the binder according to a pattern of diagonal lines.

The binder substance applied at the binder applicator station 38 should be such as to become plastic, and preferably liquid at a temperature at which the low melt thermoplastic fibers fuse. A polyvinyl chloride binder has been found satisfactory.

Downstream of the first binder applicator station 38 is provided a second binder applicator station 46 that is identical in structure and operation to the first binder applicator station, to treat the heat-resistant layer of the non-woven fabric 15. For ease of reference, similar or identical components of the binder applicator stations 38 and 46 are designated with the same reference numerals.

It will be apparent that a suitable web-handling system (not-shown in the drawings) is required between the binder applicator stations 38 and 46 in order to turn over the non-woven fabric 15, whereby its heat-resistant layer 32 will contact the coating roll 40 of the second binder applicator station 46.

The binder applied at the second binder applicator station 46 is selected to resist passage to the liquid phase at the temperature at which the low melt thermoplastic fibers and the binder of the layer 34 fuse. This feature allows to maintain the structural integrity of the entire heat-resistant layer 32, when the non-woven fabric 15 is heated to a point at which the thermally activated bonding layer 34 melts. Ethylene acetate has been found to be a particularly advantageous binder substance for this purpose. However, it will be plain to a person skilled in the art that other binder substances can be used without departing from the spirit of the invention.

In a most preferred embodiment, a non-woven fabric having the following composition has been found particularly suitable for use in making a water-permeable bag for an infusion packet in accordance with the invention.

| CONSTITUENT | PERCENTAGE BY WEIGHT OF THE NON-WOVEN FABRIC |
|---|---|
| a: thermally activated bonding layer - blend of co-polyester fibers and rayon fibers in a proportion of 75/25 respectively | 26.35% |
| b: a heat-resistant layer - 100% rayon fibers | 34.43% |
| c: polyvinyl chloride binder applied on the thermally activated bonding layer | 33.76% |
| d: ethylene acetate binder applied on the heat-resistant layer | 5.46% |

FIGS. 10 to 14 of the annexed drawings illustrate a device 48 for sealing at high speed infusion packets constructed in accordance with the invention. The sealing device 48 includes a top sealing roll 50 having journals rotatably mounted into respective bearing blocks 52. The bearing blocks 52 are slidingly mounted into respective U-shaped members 54 that are interconnected at the top by parallel and horizontally extending beams 56. The U-shaped members 54 and the beams 56 form the main frame of the sealing device 48.

Figure 13:
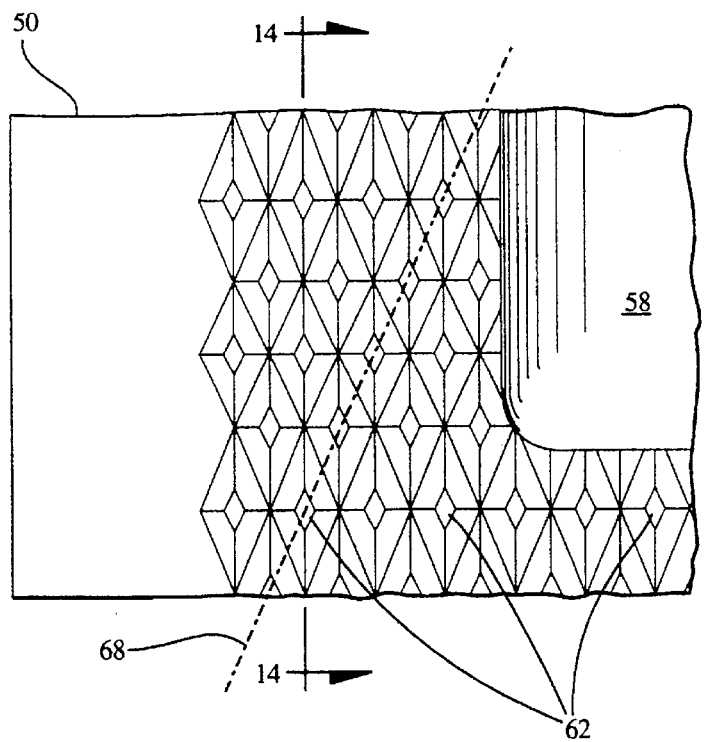
FIG. 13 is an enlarged partial plan view of the seal-forming area on the top sealing roll, illustrating the pattern of projecting members that perforate the joint area of the tea bag.

The top sealing roll 50 includes a plurality of recessed portions 58 serially arranged in pairs on the periphery of the roll. The recessed portions 58 are spaced apart from one another, defining between them a seal forming area 60 that is continuous over the entire circumference of the roll so as to completely encircle each recessed portion 58. The surface finish of the seal-forming area 60 is shown in greater detail at FIGS. 13 and 14. The seal-forming area 60 is uniformly covered with an array of small projections 62 having a diamond cross-sectional shape. The projections 62 are arranged according to a regular staggered pattern with 14 projections 62 counted per 2.54 centimeters (cm) along the imaginary axis 68 that is shown in FIG. 13. Each projection tapers from its base toward a flattened apex having the shape of a lozenge. Each side of the lozenge has a length of approximately 0.9 millimeters (mm). It should be noted that the dimensions and spacing of the projections 62 can vary without departing from the spirit of the invention.

Below the top sealing roll 50 is rotatably mounted a lower sealing roll 64 that is locked against translational movement in the frame of the sealing device 48, in other words the lower sealing roll 64 can only rotate about its axis of revolution. The lower sealing roll 64 is very similar to the top sealing roll 50. The only exception is the surface finish of the area 66 that is dimensionally identical to the seal-forming area 60. More particularly, the area 66 is smooth surfaced and free of any significant irregularities to form an anvil or back-up area that cooperates with the seal-forming area 60 to seal infusion packets.

The sealing rolls 50 and 64 define a nip region 68 in which the seal-forming and the anvil areas 60 and 66 are in rolling contact. To seal at high speed infusion packets it has been found advantageous to apply a heavy pressure on the top sealing roll 50 against the lower sealing roll 64 to avoid an undesirable vertical deflection of the top sealing roll 50 that may be caused by calliper variations of the non-woven fabric passing through the nip region 68. The pressure is generated on the top sealing roll 50 by two banks 70 of three hydraulic cylinders each acting on respective bearing blocks 52. The working fluid supplied to the hydraulic cylinders generates a pressure of approximately 300 kilograms per linear centimeter between the sealing rolls 50 and 64.

The hydraulic cylinder banks 70 act against a pair of coil springs 72 mounted between the stationary bearing blocks receiving the journals of the bottom sealing roll 64 and the movable bearing blocks 52. During the operation of the device 48 the coil springs 72 are maintained in a compressed condition. However, when the pressure of working fluid in the hydraulic cylinder banks 70 is depleted the coil springs 72 automatically raise the top sealing roll 50 and open the nip region 68. This feature is useful for maintenance purposes in order to allow convenient access to the nip 68 when cleaning or inspection of the equipment is required.

The sealing rolls 50 and 64 are heated by a plurality of electrically resistive rods 74 embedded in the rolls radially inwardly from the roll periphery. The resistive rods develop heat in response to the passage of electrical current in order to elevate the temperature of the seal-forming and anvil areas 60 and 64. Electrical current is supplied to the resistive rods 74 by rotary couplings of conventional construction (not shown in the drawings) mounted to the journals of the sealing rolls 50 and 64.

An electric motor (not shown in the drawings) drives the sealing rolls 50 and 64 in a timed relationship so that the recessed portions 58 of one roll register with the respective recessed portions 58 of the other roll at the nip region 68. One possible arrangement to positively maintain the registration between the rotating sealing rolls is to provide a gear drive between the rolls that precludes a relative rotation between the rolls. An example of such gear drive is a pair of meshing gears (not shown in the drawings) keyed to the journals of the respective rolls. The electric motor drives one of the rolls which, in turn, drives the other roll through the meshing gears.

To manufacture infusion packets in accordance with the invention, such as tea bags, a continuous web 76 of the non-woven fabric 15 is supplied from a supply station (not shown) and threaded through the nip region 68. On the run of the web 76 upstream the sealing device 48 are deposited measured amounts of particulated tea leaves in the form of small individual piles 78 separated from one another. The pattern of deposition of the tea leaves piles 78 is rigorously controlled to correspond precisely to the pattern of recesses 58 on the sealing rolls 50 and 64. This is achieved by using a metering device (not shown in the drawings) that deposits on the thermally activated bonding layer 34 of the web 76 measured quantities of tea leaves at regularly spaced intervals. It is not deemed necessary to describe the structure and operation of such metering device because is well known in the field of tea packaging.

A second continuous web 80 of the non-woven fabric 15 is supplied toward the nip region 68 at the same rate as the web 76. The web 80 passes around an idler roller 82 and wraps the top sealing roll 50 before reaching the nip region 68. The sustained contact between the circumferential surface of the top sealing roll 50 and the web 80 pre-heats the fibrous network in order to soften the bond-forming layer 34. It will be appreciated that the bond-forming layer 34 faces away from the surface of the top sealing roll 50 so that at the nip region 68 the bond-forming layers 34 of the webs 76 and 80 face each other.

At the entry of the nip region 68 the webs 76 and 80 are progressively brought toward one another so as to form the opposite side walls of tea bags yet to be sealed. At this point each tea bag displays a central protuberant portion holding the respective pile 78 of tea leaves. When passing through the nip region 68 the protuberant portion of the tea bag enters into a clamshell pocket formed by registering recessed portions 58 of the sealing rolls 50 and 64. The purpose of this pocket is to prevent the tea leaves from being crushed during the bag sealing operation. The superposed portions of the webs 76 and 80 that surround the piles 78 of tea leaves are pressed against one another by the heated seal-forming and anvil areas 60 and 66. The hot projections 62 pierce the webs 76 and 80 to establish a direct contact with the inner adhesive layers 34 so as to rapidly transfer thermal energy to the bond-forming fibers by virtue of the inherently high thermal conductivity of the metal. Consequently, a short residence time of the webs 76 and 80 in the nip region 68 is sufficient to produce a strong and durable seal. It has also been observed that the heated projections 62 can very effectively seal non-woven webs having a varying calliper. In contrast, prior art sealing devices are very sensitive to calliper variations and produce unsatisfactory seals when the thickness of the non-woven web slightly exceeds a nominal value.

The sealing rolls 50 and 64 are heated to a temperature sufficient to activate the bonding layers 34, while remaining within the tolerance range of the heat-resistant layers 32 in order to effect the sealing operation without causing the layers 32 to disintegrate or to stick to the rolls 50 or 64. With the fabric composition provided earlier in this specification, a roll temperature in the range from about 215° C. to about 370° C. has been found satisfactory.

Figure 9:
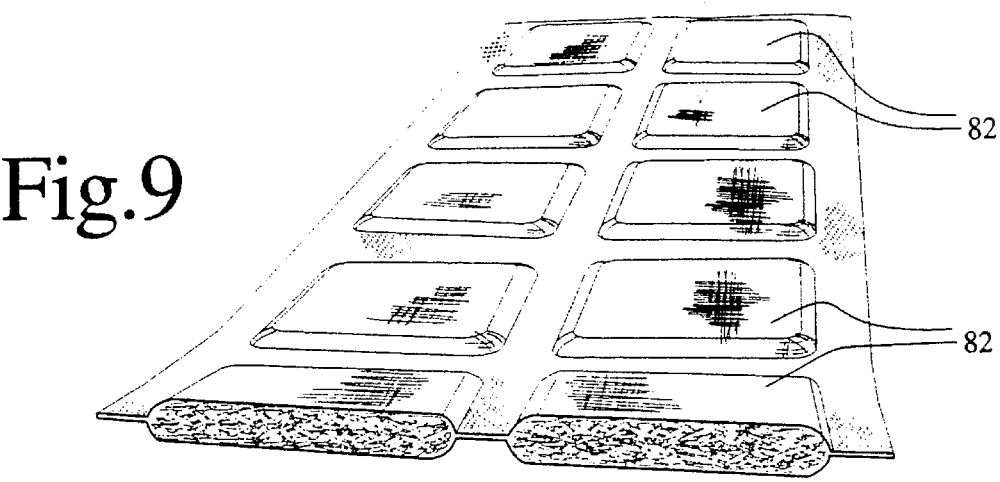
FIG. 9 is a perspective view of a continuous band of integrally formed tea bags prior to being cut into discrete products.
Figure 7:
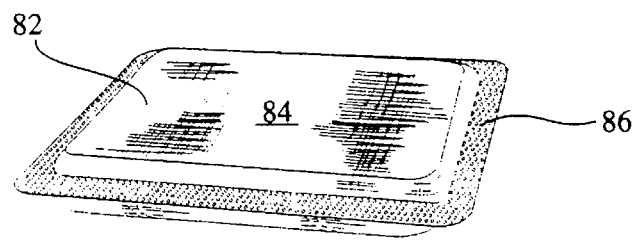
FIG. 7 is a perspective view of a tea bag in accordance with the invention.
Figure 8:
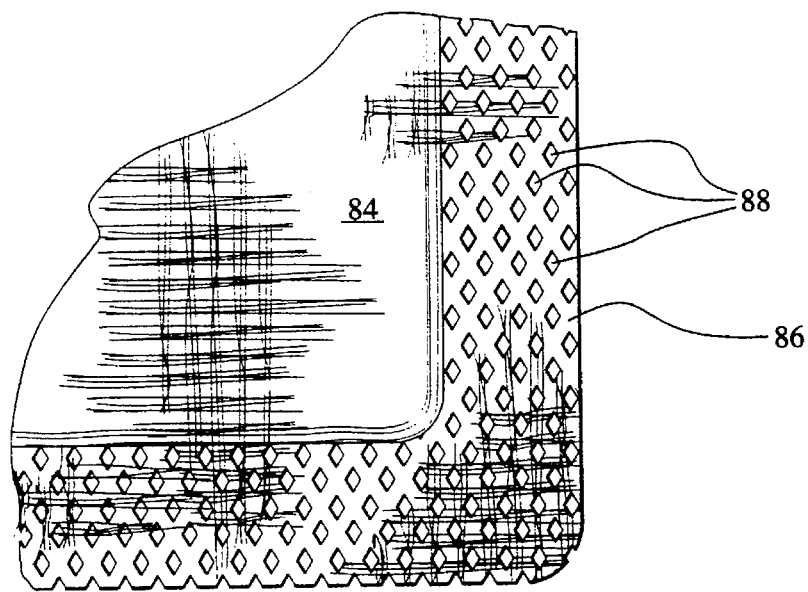
FIG. 8 is a partial enlarged plan view of the tea bag shown in FIG. 8, illustrating the structure of the peripheral joint area that completely seals the bag.
Figure 10:
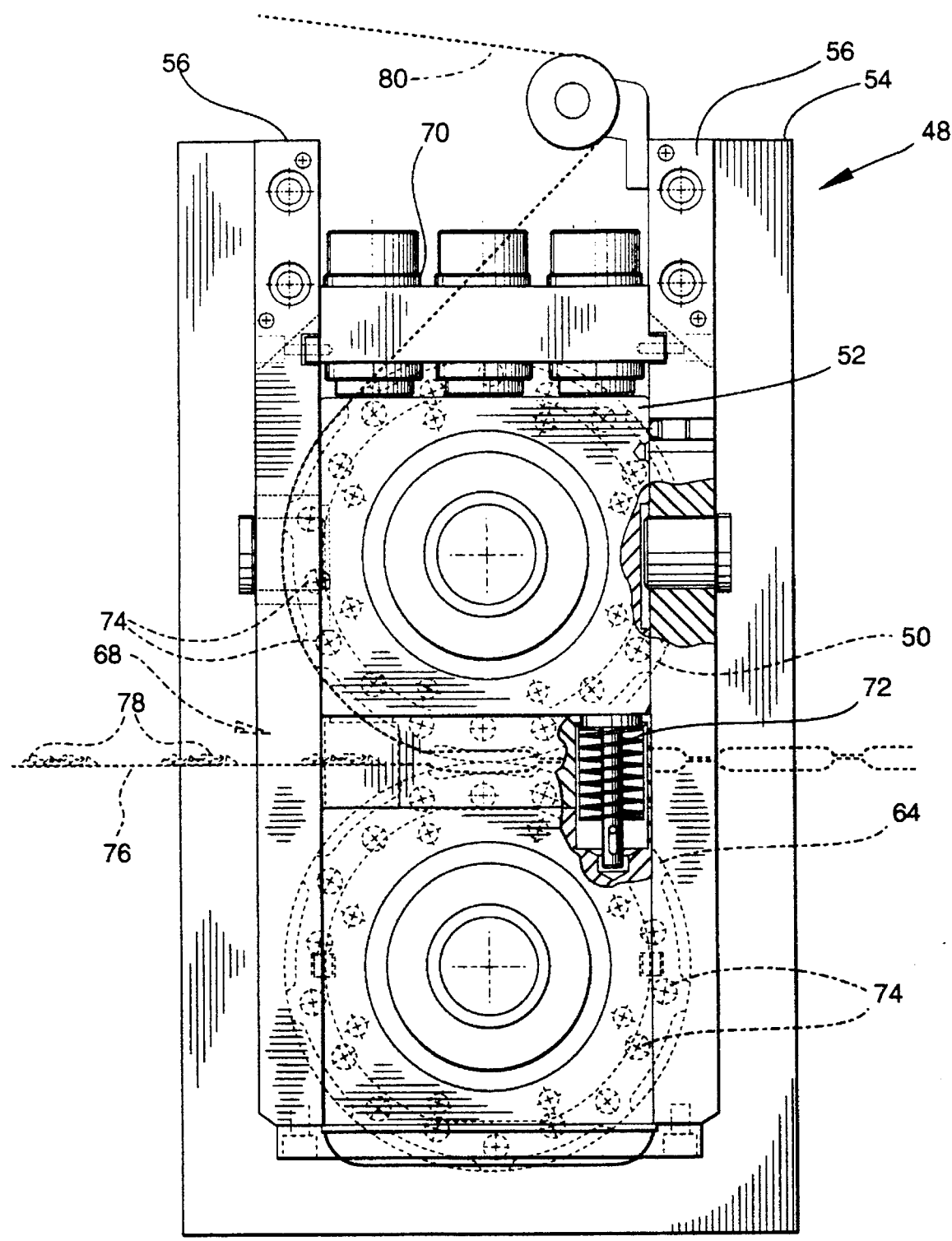
FIG. 10 is side elevational view partly cut away of a high speed device for heat-sealing tea bags in accordance with the invention.
Figure 11:
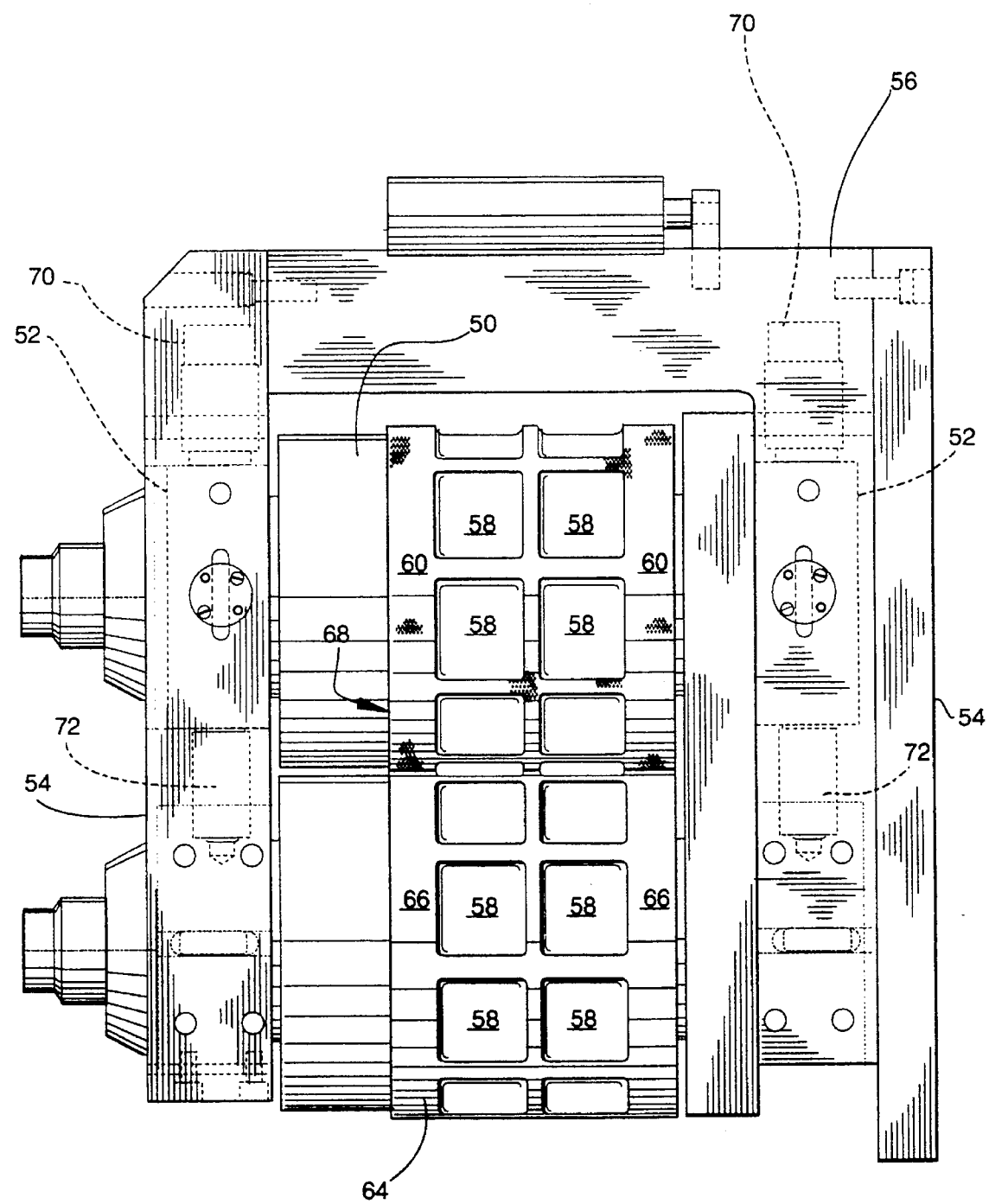
FIG. 11 is a front elevational view of the heat-sealing device shown in FIG. 10.
Figure 12:
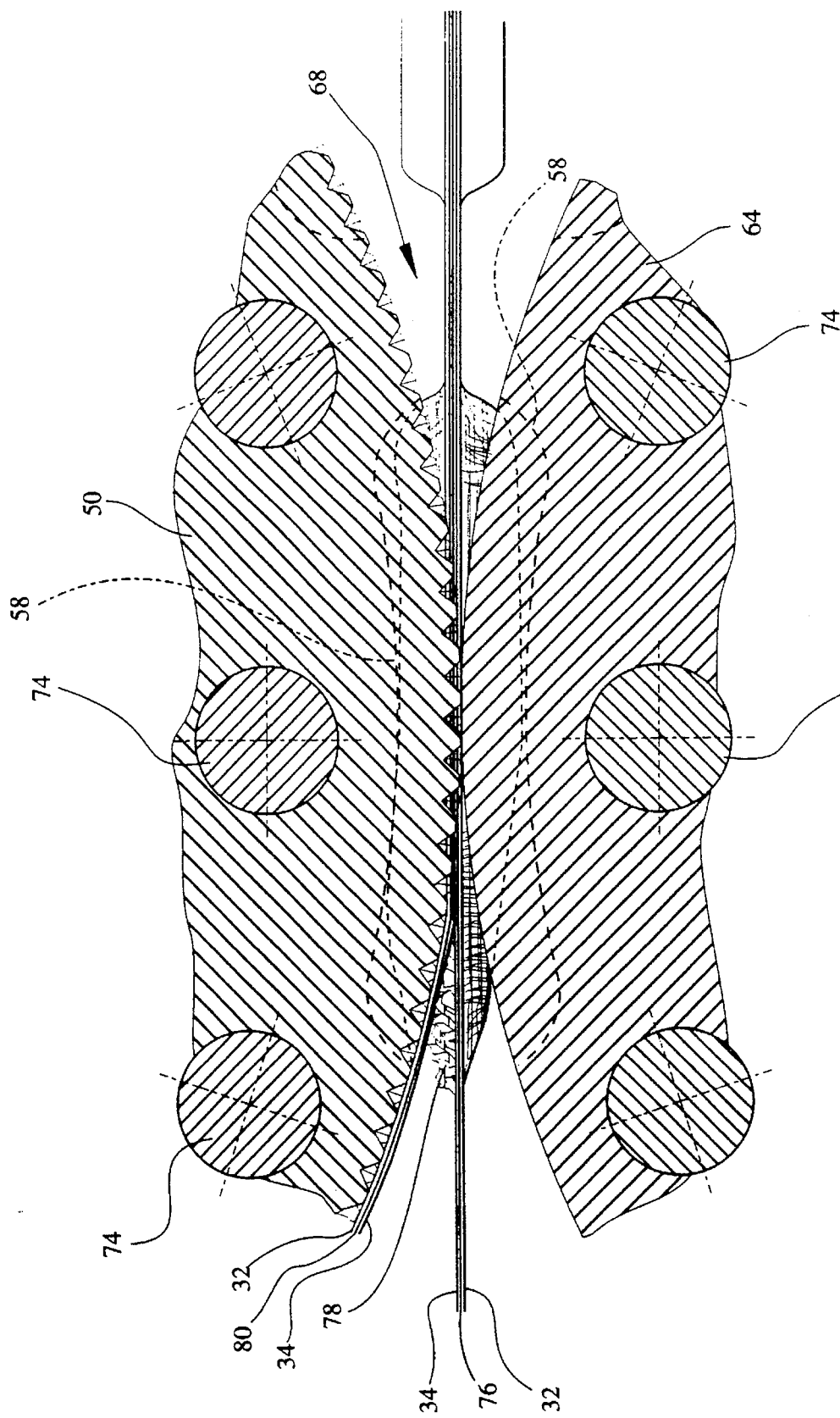
FIG. 12 is an enlarged fragmentary cross-sectional view of the nip region formed by the sealing rolls of the device shown in FIGS. 10 and 11.
Figure 14:
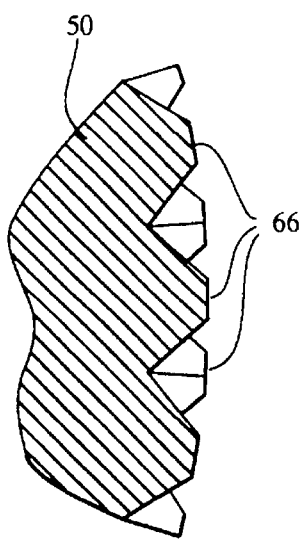
FIG. 14 is a cross-sectional view taken along lines 14—14 in FIG. 13, looking in the direction of the arrows.

The structure of the sealed webs 76 and 80 enclosing the piles of tea leaves 78 is shown in FIG. 9. The assembly is a continuous band of tea bags 82 attached to one another by their side edges. The next step of the manufacturing operation is to cut the band into discrete tea bags. This operation will not be described because it does not form part of the invention. The structure of an individual tea bag 82 is best shown in FIGS. 7 and 8. The tea bag 82 includes a central protuberant portion 84 that holds the measured amount of particulated tea leaves. The protuberant portion 84 is surrounded by a continuous peripheral joint area 86 at which the superposed marginal portions of the opposing side walls of the bag 82 are sealed to one another. The joint area is provided with a multitude of diamond-shaped perforations 88 extending completely through the four fiber layers, namely the inner pair of fused bond-forming layers and the outer pair of heat-resistant layers. The perforations 88 are the result of the intense localized pressure created by the hot individual projections 62 of the seal-forming area 60. The pressure at the tips of the projections 62 is high enough so that the fibrous material is locally crushed producing apertures arranged in accordance with the distribution profile of the projections 62.

It is observed that the side walls of the tea bag are united to one another at the joint area 86 with a significantly higher degree of intimacy in the vicinity of the perforations 88 than at locations of the joint area that are intermediate the perforations 88. The reason for such non-uniform bond is presumed to be the result of a better heat transfer near the projections 62 which produces a more complete bond in those areas.

The scope of the present invention is not limited by the description, examples and suggestive uses herein as modifications and refinements can be made without departing from the spirit of the invention. Thus, it is intended that the present application covers the modifications and variations of this invention provided that they come within the scope of the appended claims and their equivalents.

We claim:

1. A package for dispensing a substance that imparts a desirable property to a body of fluid, comprising:

a predetermined quantity of particulated substance capable of releasing an agent which donates to the body of fluid the desired property; and a bag of foraminous material enclosing said particulated substance, said bag of foraminous material constituting a confining barrier to prevent said particulated substance in a dry state to freely sift-out of said bag, said bag including a pair of walls of non-woven fibrous material united to one another at a laminated joint area formed by heat-sealing the pair of walls together, said laminated joint area including:

a) a first fiber layer including bond-forming fibers fusible at a certain temperature and forming a thermally activated bonding surface;

b) second and third fiber layers including fibers of a material in a substantially solid phase at said certain temperature, said first fiber layer being located between said second and third fiber layers; and c) a plurality of perforations in a spaced apart relationship passing completely through one of said second and third fiber layers and extending into said first fiber layer.

2. A package as defined in claim 1, wherein each said wall has a laminated structure comprising superposed outer and inner layers, the outer layers of said walls including said fibers of a material in a substantially solid phase at said certain temperature and forming said second and third layers of said joint area, the inner layers of said walls including said bond forming fibers fusible at said certain temperature, the inner layers of said walls being in a mutual adherence at said joint area.

3. A package as defined in claim 1, wherein said joint area extends along an end portion of said bag.

4. A package as defined in claim 1, wherein said joint area is continuous and extends peripherally around said bag.

5. A package as defined in claim 1, wherein said perforations define apertures extending completely through said joint area.

6. A package as defined in claim 1, wherein said walls are united to one another in a vicinity of said perforations with a higher degree of intimacy than at locations on said joint area that are spaced apart from said perforations.

7. A package as defined in claim 1, wherein said perforations are distributed substantially uniformly over said joint area.

8. A package as defined in claim 1, wherein said perforations are arranged on said joint area according to a staggered pattern.

9. A package as defined in claim 1, wherein said first fiber layer includes binder fusible at said certain temperature.

10. A package as defined in claim 9, wherein said binder includes polyvinyl chloride.

11. A package as defined in claim 1, wherein said second fiber layer and said third fiber layer include binder which is in a substantially solid phase at said certain temperature.

12. A package as defined in claim 11, wherein said binder includes ethylene acetate.

13. A package as defined in claim 1, wherein said first fiber layer includes co-polyester fibers.

14. A package as defined in claim 1, wherein said first fiber layer includes a blend of co-polyester fibers and rayon fibers.

15. A package as defined in claim 1, wherein said second fiber layer includes rayon fibers.

16. A package as defined in claim 1, wherein said particulated substance is steepable to produce an edible infusion.

17. A package as defined in claim 1, wherein said particulated substance is selected from the group consisting of tea, coffee and herb.

* * * * *